Sept. 18, 1956            D. PORRET            2,763,676
METHOD OF PURIFYING A CUPROUS SALT CATALYST
IN THE SYNTHESIS OF ACRYLONITRILE
Filed Sept. 24, 1953
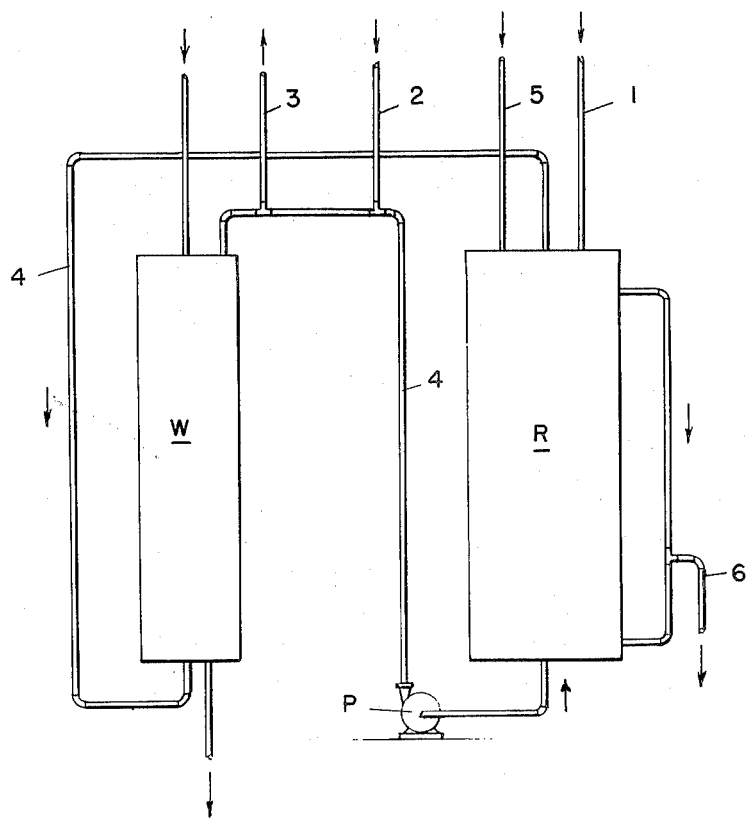
INVENTOR
DANIEL PORRET
BY
ATTORNEYS

United States Patent Office 2,763,676
Patented Sept. 18, 1956

2,763,676

METHOD OF PURIFYING A CUPROUS SALT CATALYST IN THE SYNTHESIS OF ACRYLONITRILE

Daniel Porret, Monthey, Switzerland, assignor to Ciba Limited, Basel, Switzerland, a Swiss firm Application September 24, 1953, Serial No. 382,097

Claims priority, application Switzerland August 28, 1953

10 Claims. (Cl. 260—465.3)

It is known to manufacture acrylonitrile by reacting acetylene with hydrocyanic acid in the presence of an aqueous cuprous salt catalyst according to the equation

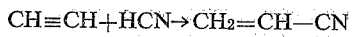

$$CH \equiv CH + HCN \rightarrow CH_2 = CH - CN$$

The reaction is advantageously carried out at about 80–100° C.

Among the cuprous salt catalysts hitherto used for the above synthesis of acrylonitrile the so-called Nieuwland catalyst has been found to be especially suitable. In its most usual form this catalyst consists of a mixture of 45.5 parts by weight of cuprous chloride, 24.5 parts by weight of ammonium chloride, 2.4 parts by weight of concentrated hydrochloric acid and 42 parts by weight of water. The ammonium chloride may be replaced by an equivalent quantity of a mixture of potassium chloride and sodium chloride, and instead of the hydrochloric acid another strong acid, such as hydrobromic acid, sulfuric acid or phosphoric acid may be used.

Depending on the reaction conditions used the relative proportions of the components contained in the catalyst may vary within certain limits.

In the process as carried out in practice the catalyst mixture is heated in a reaction tower at 70–100° C., and acetylene is passed through the hot mixture and liquid hydrocyanic acid or a solution of hydrocyanic acid is simultaneously introduced dropwise or gaseous hydrocyanic acid is introduced together with the acetylene stream. The acrylonitrile so formed is removed from the reaction tower by the current of acetylene, is dissolved out of the gas stream by absorption in water or by condensation, and is isolated by fractional distillation, the excess of acetylene being returned to the reaction tower. In this method of working the acetylene may be diluted by the addition of an inert gas, such as nitrogen.

The duration of the above continuous process is limited by the fact that the utility of the catalyst is impaired, inter alia, by the formation of resinous and gummy by-products and the apparatus becomes clogged so that the synthesis must be discontinued after a little time in order to renew the whole of the catalyst.

At a raised temperature the fresh Nieuwland catalyst is a clear liquid having a yellowish coloration. During the synthesis of acrylonitrile the catalyst becomes red-brown and finally black, and oil droplets and solid by-products separate out, which in time clog the apparatus and impair the utility of the catalyst. In practice the catalyst is generally renewed when the quantity of acrylonitrile formed in unit time has fallen to about one half of the quantity formed with fresh catalyst.

The by-products, which diminish the activity of the catalyst, are formed in part from impurities in the acetylene used, for example, from diacetylene, allylene, and in part from other unsaturated compounds such as vinyl-acetylene, divinyl-acetylene and cyanobutadiene formed in small amounts as by-products in the synthesis of acrylonitrile, and even from acrylonitrile itself.

There have already been proposed methods designed to remove the primary impurities which lead to the formation of by-products so as to prolong the active life of the cuprous salt catalyst. To this end the fresh acetylene is purified before use by washing with high boiling solvents, oils or sulfuric acid. However, it is almost impossible to eliminate the impurities completely in this manner. Moreover, the circulating acetylene, before it is returned to the reaction tower, is also subjected to a purification treatment in order to remove vinylacetylene and divinylacetylene. For this purpose the gaseous mixture is cooled to a low temperature, for example −70° C., or the gas is passed through active carbon. In this manner the formation of undesired polymerization products cannot be completely prevented, so that the active life of the catalyst is prolonged for only a relatively short time.

The present invention is based on the observation that, long before greasy and resinous materials separate, polymerization products are present in solution in the hot catalyst. They separate out when the catalyst is cooled or diluted with water. Since at ordinary or a slightly raised temperature part of the salts crystallize out of the catalyst solution, it is comparatively difficult to establish reaction conditions under which the polymerization products separate out whereas no appreciable quantities of salts are simultaneously precipitated. Diluting the catalyst with water alone is practically not feasible either, because the cuprous salts would then not be soluble.

The present invention is based on the observation that the cuprous salt catalyst can be diluted with water without the cuprous salts separating, even at ordinary temperature, if an agent yielding chlorine ions is added to the water. Based on this observation, a regenerating and purification process for the cuprous salt catalyst used in the manufacture of acrylonitrile can be carried out, which is characterized by the fact that at least a part of the catalyst is removed from the synthesis apparatus, diluted with water with the addition of an agent yielding chlorine ions, advantageously while cooling the catalyst, in such manner that the cuprous salts remain in solution while polymerization products separate out, the polymerizates are isolated, and the copper is separated from the purified solution.

As agents providing chlorine ions there may be used hydrochloric acid, hydrochlorides of organic bases, such as pyridine hydrochloride, and above all water soluble inorganic chlorides. Among these there may be mentioned the chlorides of zinc, aluminum, barium, magnesium, and calcium. There are preferably used alkali chlorides, e. g. sodium chloride or potassium chloride, or ammonium chloride. The quantity of the agent yielding chlorine ions which has to be added in order to prevent the cuprous salts from separating out at a given dilution with water, depends on the temperature at which the purification takes place and also on the nature of the agent used. The preferred procedure is to carry out the purification at ordinary temperature and to use ammonium chloride or sodium chloride as the agent providing chlorine ions. For the purification at ordinary temperature, the following relative proportions of water and the ammonium chloride or sodium chloride necessary to maintain the cuprous salts in solution have been ascertained.

Composition of the catalyst in parts by weight:

36.7 parts of water
39.8 parts of cuprous chloride
21.4 parts of ammonium chloride
2.1 parts of concentrated hydrochloric acid

---

100 parts 100 parts of this catalyst, to which there have been added 2 parts of concentrated hydrochloric acid, can be diluted at 20° C. in the following manner, no cuprous salts being precipitated:

With 130 parts of water when 21.4 parts of ammonium chloride were used;
With 300 parts of water when 42.8 parts of ammonium chloride were used;
With 610 parts of water when 64.2 parts of ammonium chloride were used;
With 90 parts of water when 23.3 parts of sodium chloride were used;
With 200 parts of water when 46.6 parts of sodium chloride were used;
With 370 parts of water when 69.9 parts of sodium chloride were used.

This list clearly shows that the permissible dilution depends on the kind of agent yielding chlorine ions. The degree of dilution depends on the ease with which the polymerization products separate. As a rule, dilution to double to six times the volume of the catalyst suffices.

The precipitated polymers can be removed from the dilute solution by simple mechanical means, such as centrifuging or filtration. Advantageously, filtration is carried out over a surface-active carrier substance, such as active carbon or active earth.

The copper may be separated from the purified solution by known methods. It may, for example, be precipitated by the addition of zinc or iron in the form of the so-called "precipitated copper." When the catalyst has been prepared with sodium chloride or potassium chloride and a like chloride has been used for the dilution, precipitation of the copper in the form of its hydroxide comes into consideration. The preferred procedure, however, is the precipitation of cuprous cyanide because this salt can be reintroduced without further manipulation into the catalyst in the synthesis of acrylonitrile. For the precipitation of the cyanide, alkali cyanides or alkaline earth cyanides may be used or hydrocyanic acid in liquid form, in solution, or in gaseous form. From the dilute cuprous salt solutions the copper can be almost completely precipitated in the form of cuprous cyanide.

In precipitating the cuprous cyanide, an excess of alkali cyanide or hydrocyanic acid should be avoided, if possible, lest a part of the cuprous cyanide should redissolve. If too much soluble cyanide has been added, the copper can be precipitated again by adding cuprous chloride. The precipitated cuprous cyanide is advantageously filtered off and washed with water. The moist paste can be reintroduced directly into the catalyst in which it dissolves within a short time.

The present process not only provides a simple and cheap method of purifying and regenerating the catalyst, but also makes it possible to keep its activity high. As is known, the catalyst has its greatest activity when the molecular ratio of cuprous chloride to ammonium chloride is about 1:1. During the synthesis of acrylonitrile the ammonium chloride content increases on account of the partial hydrolysis of the hydrocyanic acid and the acrylonitrile, resulting in a decreased activity of the catalyst. In the afore-described purifying and regenerating operations, part of the ammonium chloride is also removed so that the ratio of cuprous chloride to ammonium chloride can be kept constant.

In carrying out the process of this invention, the entire quantity of catalyst in the synthesis apparatus can be purified and regenerated. This, however, will interrupt the manufacture of acrylonitrile. It is therefore much better to purify and regenerate only a portion of the catalyst, such portion being so selected that the manufacture of acrylonitrile is not affected and does not have to be interrupted.

The frequencies with which it is necessary to carry out the purification and regeneration operation, whether the total quantity of the catalyst or only a part thereof is subjected thereto, depends on the speed of formation of the polymerization products, which is influenced by the purity of the starting materials and other conditions of the synthesis. It has been found that the hot catalyst can hold in solution about 1 per cent of polymerization products. Only after exceeding the limit of saturation do insoluble oil droplets and greasy material form in the catalyst. When a fresh catalyst is used it takes about 3–5 days to reach the limit of saturation. When about one-tenth of the total quantity of catalyst is subjected to a single purification treatment, it suffices in such cases to carry out the purification treatment two to three times per day, in order to keep the content of polymerization products in the catalyst below the saturation point.

The following examples illustrate the invention:

*Example 1*

The apparatus used for the synthesis is shown diagrammatically in the accompanying drawing. The apparatus consists principally of a reaction tower R with a branch pipe, and of a washing tower W in which the acrylonitrile is washed. The two towers are connected by means of a conduit 4 provided for the circulation of gas, the circulation being maintained by a pump P. The hydrocyanic acid is supplied in anhydrous liquid form or in the form of an aqueous solution through the conduit 1. The system is supplied with fresh acetylene through conduit 2, and a part of the circulating gas is removed as waste gas through the conduit 3.

For starting the synthesis 60 liters of Nieuwland catalyst are charged into an apparatus of appropriate capacity. The catalyst consists of 35.2 per cent. of water, 40.8 per cent. of cuprous chloride, 22.0 per cent. of ammonium chloride, 0.6 per cent. of copper powder and 1.4 per cent. of concentrated hydrochloric acid. The catalyst is heated to about 80° C. and nitrogen is caused to flow into the system through the conduit 2, the nitrogen causing the catalyst to circulate through the tower R and the lateral branch pipe. The catalyst is first charged with hydrocyanic acid which enters through the conduit 1. As soon as the nitrogen leaving the reaction tower contains per 100 liters, about 0.5 gram of hydrocyanic acid, the nitrogen is replaced by acetylene, whereupon the formation of acrylonitrile sets in immediately. About 15–20 per cent. of the fresh acetylene are removed as waste gas through conduit 3.

After about 5 days the catalyst solution is saturated with polymerization products, which make up about 1 per cent. and at the same time the ammonium chloride content has increased so that the formation of acrylonitrile is reduced. Six liters=9.5 kg. of catalyst are removed through conduit 6 and run into a cold solution of 2.6 kg. of ammonium chloride in 17 liters of water and 0.2 kg. of concentrated hydrochloric acid. The cuprous salts dissolve whereas the polymers precipitate. The latter are removed by filtering the solution over a surface active mass. From the purified solution the copper is precipitated as cuprous cyanide, either by introducing gaseous hydrocyanic acid or by adding a solution of sodium cyanide until all of the copper is precipitated. The cuprous cyanide is filtered off, washed with water and the moist paste introduced into the catalyst at 5. It dissolves quickly therein.

If the described purification treatment is carried out 3 times daily, the polymer content can be kept at 0.7–1 per cent. of the catalyst quantity, whereby the separation of polymers in the synthesis apparatus is prevented. From time to time some hydrochloric acid, and, when necessary, some ammonium chloride must be added to the catalyst.

The afore-described purifying operations can also be carried out continuously in that during the entire synthesis of acrylonitrile some of the catalyst is continually removed from the apparatus at 6, diluted with ammonium chloride solution and filtered, and the cuprous cyanide is precipitated and, washed and, in the form of a paste, reintroduced into the reaction tower at 5.

Example 2

The procedure is the same as described in Example 1, but there are used for the dilution of the catalyst aqueous solutions of an alkali chloride, such as sodium chloride, an alkaline earth chloride, such as calcium chloride, or of aluminum chloride, respectively.

Example 3

The procedure is the same as described in Example 1, but there is used for the dilution of 6 liters of catalyst a solution of 4.2 kg. of ammonium chloride in 30 liters of water or a solution of 6.4 kg. of ammonium chloride in 61 liters of water.

Example 4

The procedure is the same as described in Example 1, but there is used for the dilution of the catalyst a solution of hydrochloric acid or one of pyridine hydrochloride.

What is claimed is:

1. In the process of the purification and regeneration of the cuprous salt catalyst used in the synthesis of acrylonitrile from hydrocyanic acid and acetylene, the improvement which comprises removing from the apparatus at least a part of the catalyst containing polymerization products in solution, diluting it with water with the addition of an agent yielding chlorine ions in aqueous solution and selected from the group consisting of ammonium chloride, alkali metal chlorides, alkaline earth metal chlorides, aluminum chloride and pyridine hydrochloride, until only the polymerization products are precipitated, the cuprous salts remaining in solution, removing the precipitated polymerization products and separating the copper from the purified solution.

2. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with an aqueous solution of an alkali chloride while cooling to ordinary temperature, until only the polymerization products are precipitated, the cuprous salts remaining in solution, removing the precipitated polymerization products by filtration and separating the copper from the purified solution.

3. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with an aqueous solution of sodium chloride while cooling to ordinary temperature, until only the polymerization products are precipitated, the cuprous salts remaining in solution, removing the precipitated polymerization products by filtration and separating the copper from the purified solution.

4. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with an aqueous solution of ammonium chloride while cooling to ordinary temperature, until only the polymerization products are precipitated, the cuprous salts remaining in solution, removing the precipitated polymerization products by filtration and separating the copper from the purified solution.

5. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with an aqueous solution of ammonium chloride while cooling to ordinary temperature until only the polymerization products are precipitated, the cuprous salts remaining in solution, removing the precipitated polymerization products by filtration over a surface-active carrier substance, and separating the copper from the purified solution by precipitating it as cuprous cyanide.

6. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with an aqueous solution of ammonium chloride while cooling to ordinary temperature until only the polymerization products are precipitated, the cuprous salts remaining in solution, removing the precipitated polymerization products by filtration over active carbon, and separating the copper from the purified solution by precipitating it as cuprous cyanide with the aid of an alkali cyanide.

7. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with water with the addition of an agent yielding chlorine ions in aqueous solution and selected from the group consisting of ammonium chloride, alkali metal chlorides, alkaline earth chlorides, aluminum chloride and pyridine hydrochloride, until only the polymerization products are precipitated, the cuprous salts remaining in solution, removing the precipitated polymerization products and separating the copper from the purified solution by precipitating it as cuprous cyanide, washing the precipitated cuprous cyanide with water and reintroducing the moist cuprous cyanide into the catalyst.

8. In the process of the purification and regeneration of the cuprous salt catalyst used in the synthesis of acrylonitrile from hydrocyanic acid and acetylene, the improvement which comprises removing from the apparatus a part of the catalyst containing polymerization products in solution, diluting it with an aqueous solution of ammonium chloride while cooling to ordinary temperature until only the polymerization products are precipitated, the cuprous salts remaining in solution, removing the precipitated polymerization products by filtration over active carbon and separating the copper from the purified solution by precipitating it as cuprous cyanide with the aid of an alkali cyanide, washing the precipitated cuprous cyanide with water and reintroducing the moist cuprous cyanide into the catalyst.

9. In the process of the purification and regeneration of the cuprous salt catalyst used in the synthesis of acrylonitrile from hydrocyanic acid and acetylene, the improvement which comprises removing from the apparatus about one tenth of the catalyst containing polymerization products in solution, diluting it with an aqueous solution of ammonium chloride while cooling to ordinary temperature until only the polymerization products are precipitated, the cuprous salts remaining in solution, removing the precipitated polymerization products by filtration over active carbon and separating the copper from the purified solution by precipitating it as cuprous cyanide with the aid of an alkali cyanide, washing the precipitated cuprous cyanide with water and reintroducing the moist cuprous cyanide into the catalyst, said purification and regeneration process being carried out three times daily, the arcylonitrile synthesis being performed continuously.

10. In the process of the purification and regeneration of the cuprous salt catalyst used in the synthesis of acrylonitrile from hydrocyanic acid and acetylene, the improvement which comprises removing from the apparatus continuously a part of the catalyst containing polymerization products in solution, diluting it with an aqueous solution of ammonium chloride while cooling to ordinary temperature until only the polymerization products are precipitated, the cuprous salts remaining in solution, removing the precipitated polymerization products by filtration over active carbon and separating the copper from the purified solution by precipitating it as cuprous cyanide with the aid of an alkali cyanide, washing the precipitated cuprous cyanide with water and reintroducing the moist cuprous cyanide into the catalyst, the acrylonitrile synthesis being performed continuously.

References Cited in the file of this patent

UNITED STATES PATENTS

| Number | Name | Date |
|---|---|---|
| 1,614,523 | Cooper | Jan. 18, 1927 |
| 2,049,358 | Danglemajer | July 28, 1936 |
| 2,632,737 | Stehman | Mar. 24, 1953 |
| 2,653,965 | Thomas | Sept. 29, 1953 |
| 2,688,632 | Carpenter et al. | Sept. 7, 1954 |

FOREIGN PATENTS

| Number | Country | Date |
|---|---|---|
| 639,158 | Germany | Nov. 30, 1936 |